(12) United States Patent
Bawcom

(10) Patent No.: US 11,233,708 B1
(45) Date of Patent: Jan. 25, 2022

(54) SYSTEM, APPARATUS AND METHOD FOR DEPLOYING INFRASTRUCTURE TO THE CLOUD

(71) Applicant: Candid Partners, LLC, Atlanta, GA (US)

(72) Inventor: Aaron Bawcom, Brookhaven, GA (US)

(73) Assignee: Candid Labs, Inc., Atlanta, GA (US)

( * ) Notice: Subject to any disclaimer, the term of this patent is extended or adjusted under 35 U.S.C. 154(b) by 0 days.

(21) Appl. No.: 16/995,258

(22) Filed: Aug. 17, 2020

Related U.S. Application Data

(62) Division of application No. 16/197,910, filed on Nov. 21, 2018, now Pat. No. 10,785,128.

(51) Int. Cl.
*G06F 15/16* (2006.01)
*H04L 12/24* (2006.01)
*G06F 9/451* (2018.01)
*G06Q 10/06* (2012.01)

(52) U.S. Cl.
CPC .......... *H04L 41/5048* (2013.01); *G06F 9/451* (2018.02); *G06Q 10/0633* (2013.01); *H04L 41/22* (2013.01); *H04L 41/5096* (2013.01)

(58) Field of Classification Search
CPC .. H04L 41/22; H04L 41/5096; H04L 41/5048
USPC ....................................................... 709/220
See application file for complete search history.

(56) References Cited

U.S. PATENT DOCUMENTS

| | | | |
|---|---|---|---|
| 8,755,522 B2 | 6/2014 | Stella et al. | |
| 8,819,836 B2 | 8/2014 | Stella et al. | |
| 9,003,372 B2 | 4/2015 | Stella et al. | |
| 9,166,890 B2* | 10/2015 | Maytal | G06F 9/4856 |
| 9,508,095 B2 | 11/2016 | Stella et al. | |
| 10,379,910 B2* | 8/2019 | Balasubramanian | G06F 9/5072 |
| 10,693,963 B2* | 6/2020 | Liu | H04L 67/1029 |
| 2013/0332588 A1* | 12/2013 | Maytal | H04L 41/18 709/223 |
| 2014/0122577 A1* | 5/2014 | Balasubramanian | H04L 43/50 709/203 |

(Continued)

OTHER PUBLICATIONS

Prasath Sivasubramaniyan, Estate (Terraform UX)—Github, retrieved Dec. 6, 2018, https://github.com/tsprasath/estate.

(Continued)

*Primary Examiner* — Moustafa M Meky
(74) *Attorney, Agent, or Firm* — Morris, Manning & Martin, LLP; Daniel E. Sineway, Esq.

(57) ABSTRACT

System, apparatus and method of prioritizing a plurality of software applications for a migration to a cloud computing environment operated for an enterprise. For example, an application scoring module is configured to determine a default score for the software application based, at least in part, on the information received by a survey module. The weighting module is configured to receive weights assigned by the enterprise for each of a plurality of characteristics concerning the software application, respectively, the weights reflective of an understanding by the enterprise of at least one of the value to the enterprise of the software application and the complexity of migrating the software application. According to this embodiment, the application scoring module is configured to generate a customized score for the software application based on an adjustment to the default score resulting from the weights.

6 Claims, 9 Drawing Sheets

(56) References Cited

U.S. PATENT DOCUMENTS

| | | | |
|---|---|---|---|
| 2016/0139895 A1 | 5/2016 | Stella et al. | |
| 2017/0012854 A1* | 1/2017 | Balasubramanian | ........................ G06F 9/5072 |
| 2017/0099191 A1 | 4/2017 | Stella et al. | |
| 2018/0019985 A1 | 1/2018 | Schoof | |
| 2018/0020008 A1 | 1/2018 | Schoof | |
| 2018/0034847 A1 | 2/2018 | Stella | |
| 2018/0191599 A1* | 7/2018 | Balasubramanian | ... H04L 67/10 |
| 2018/0246738 A1 | 8/2018 | McCourtney et al. | |
| 2018/0270299 A1 | 9/2018 | McCourtney et al. | |
| 2019/0014178 A1* | 1/2019 | Liu | ..................... H04L 67/1097 |

OTHER PUBLICATIONS

Rean Cloud, REAN DevOps Accelerators landing page, retrieved Jan. 16, 2018, http://go.reancloud.com/rean-accelerator-platform.

Deloitte Digital: ATADATA, ATAsphere landing page, retrieved Jan. 16, 2018, https://www2.deloitte.com/us/en/pages/consulting/solutions/atasphere.html#.

Accenture, Accenture Cloud Platform landing page, retrieved Jan. 16, 2018, https://www.accenture.com/us-en/cloud-platform-management.

Cloud Reach, Sceptre and Cloudreach Connect landing page, retrieved Jan. 16, 2018, https://www.cloudreach.com/cloudreach-sceptre/.

Cloudamize, Cloudamize platform landing page, retrieved Jan. 16, 2018, https://www.cloudamize.com/platform.

Divvycloud, product landing page, retrieved Jan. 16, 2018, https://divvycloud.com/product/compliance/.

Dome9 Security, compliance landing page, retrieved Jan. 16, 2018, https://www.checkpoint.com/products/public-cloud-compliance-governance/; redirected from https://dome9.com/compliance.

CloudPassage, Halo, product landing page, retrieved Jan. 16, 2018, https://www.cloudpassage.com/product/.

Fugue, Risk Manager & Fugue Platform, product landing page, retrieved Jan. 16, 2018, https://www.fugue.co/product.

CloudHealth Technologies, identify cloud risks landing page, retrieved Jan. 16, 2018, https://www.cloudhealthtech.com/solutions/identify-cloud-risks.

CloudBolt, Cross-Cloud Blueprints landing page, retrieved Jan. 16, 2018, https://www.cloudbolt.io/platform/cross-cloud-blueprints/.

Rean Cloud, REAN DevOps Accelerators publication, retrieved Jan. 16, 2018, https://www.reancloud.com/wp-content/uploads/2017/03/REAN-DevOps-Accelerators.pdf.

\* cited by examiner

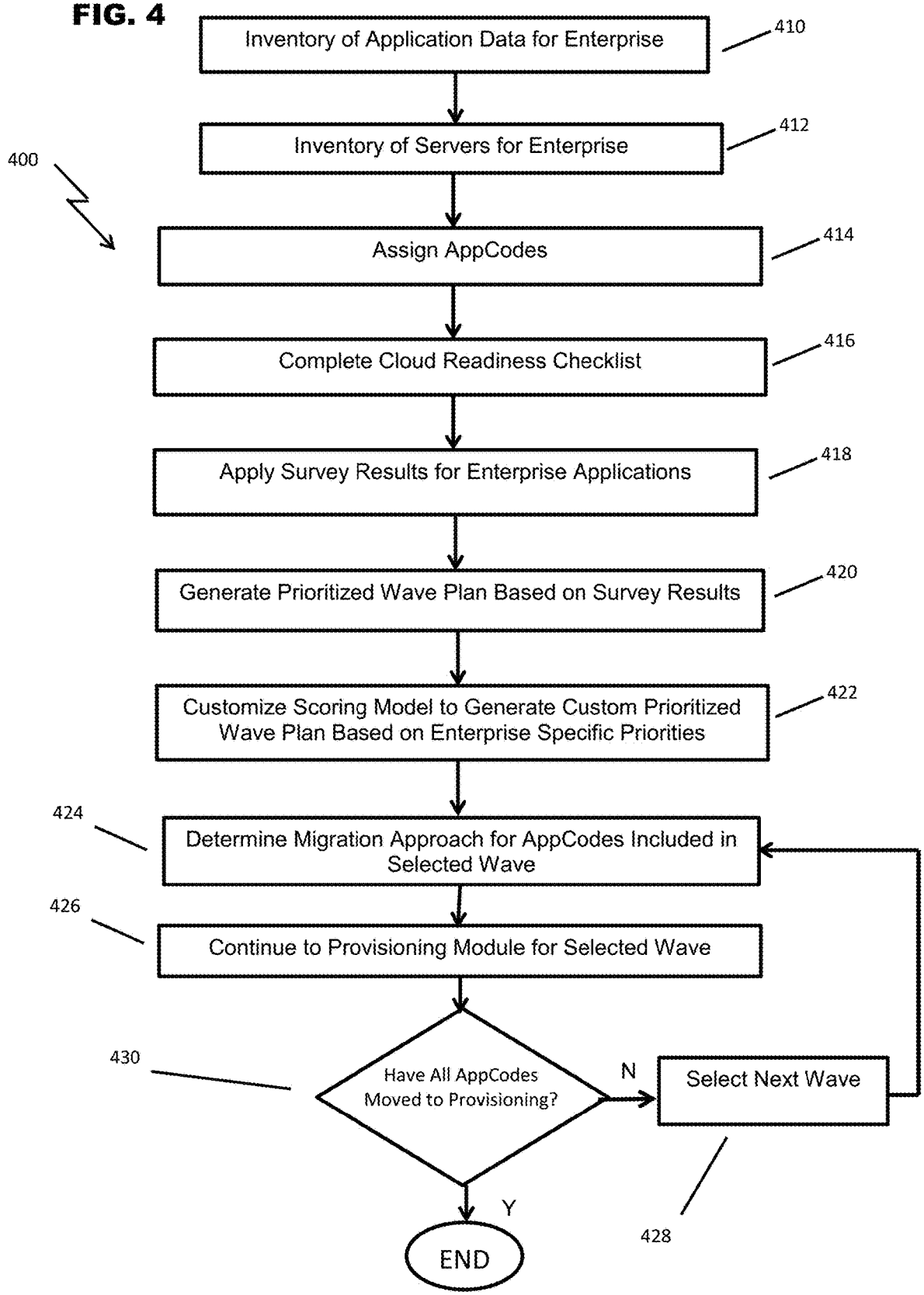

| | Title | Survey Question | Category |
|---|---|---|---|
| 61 | Operational Complexity | What is the operational complexity of the application regarding number of incidents, frequency of releases, etc.? | Application Complexity |
| 62 | Environment Migration Priority | Which environment is the priority for migration? An example of why an environment would be prioritized is that it has a large infrastructure footprint, and there would be a cost savings in the cloud. | Application Complexity |
| 63 | Application Size | Roughly how large is this application? Base your answer on your best guess based on a variety of factors potentially including number of users, number of integrations, amount of data, etc. | Application Complexity |
| 64 | Development Team Size | What is the size for the core development team for this team? | Application Complexity |
| 65 | Business Continuity Plan | Does your application have a business continuity plan? A business continuity plan is a strategy document that defines the potential risks to the operation of the application and details how the steps to be taken in order to return to normal business operations. | Application Complexity |
| 66 | DR Second Instance | Will your disaster recovery strategy in the cloud for this application require an always running second instance in order to meet its RTO? | Application Complexity |
| 67 | Annual Cost Reduction | What is the estimated annual cost reduction? | Business Value |
| 68 | Current On Prem Storage And Compute | What are the current on prem annual costs? | Business Value |
| 69 | Projected AWS Cost | What are the projected annual AWS Costs? | Business Value |
| 70 | Net Profit or Loss | What is the 5-Year Net Profit / (Loss) of moving the app to AWS? | Business Value |
| 71 | Supported business process and impact | On a scale of 1-5, with 5 being the highest, how much does this application impact your core business processes? | Business Value |

FIG. 5

SYSTEM, APPARATUS AND METHOD FOR DEPLOYING INFRASTRUCTURE TO THE CLOUD

CROSS-REFERENCE TO RELATED APPLICATIONS

This application is a divisional of, and claims priority to, U.S. patent application Ser. No. 16/197,910, filed Nov. 21, 2018, and entitled "SYSTEM, APPARATUS AND METHOD FOR DEPLOYING INFRASTRUCTURE TO THE CLOUD," the disclosure of which is hereby incorporated by reference herein in its entirety.

BACKGROUND OF INVENTION

1 Field of Invention

This invention relates generally to systems, apparatus and methods for deploying information technology resources to the cloud. More specifically, at least one embodiment, relates to systems, apparatus and methods to create and deploy infrastructure-as-code.

2. Discussion of Related Art

Today, the scalability and reliability provided by cloud services is recognized by enterprises of all sizes. Estimates find that by the end of 2018 more than half of global enterprises will rely on at least one public cloud platform. As a result, large numbers of applications and large volumes of data are being migrated from data centers to the public cloud. Many enterprises employ a DevOps model in which the development team for software applications and the operations team for the software applications are merged into a single team with the engineers working across the entire application lifecycle, from development and test to deployment to operations. These DevOps teams have responsibility for the migration of the enterprise's software resources to the cloud.

Because of the volume of software resources being migrated to the public cloud, there is a corresponding effort to provide tools to assist teams involved in cloud migration. However, the scale and complexity of these migrations creates a considerable challenge for most enterprises. Further, current approaches and tools used for cloud-migration by DevOps teams and others are often cumbersome and inefficient for many users. As a result, even though cloud solutions such as Amazon Web Services (AWS) go to tremendous lengths to help enterprises transition to the cloud, the process can be unsuccessful. In fact, close to sixty percent of enterprises report stalled or failed cloud migrations. Accordingly, improvements in the software tools and processes used for cloud migration are needed.

Properly securing IT assets that run in cloud infrastructure is one of the largest reasons for stalled cloud deployments. There are several Infrastructure-as-Code (IaC) technologies that declaratively describe infrastructure including but not limited to YAML or HCL based configurations. There have been attempts to provide static pre-deployment analysis of IaC for security purposes using Policy as Code (PaC) based technologies. However, some of these approaches do not provide the level of abstractions needed to allow a user to specify many of the diverse forms of security specifications that can be used to secure infrastructure resources. Also, these approaches do not provide the ability to correlate infrastructure dependencies across different deployments of infrastructure resources. Further, these approaches can only enforce compliance on statically defined infrastructure resources in a single language such as YAML and HCL. Lastly, these approaches also do not allow the same Policy as Code definition to also enforce compliance on resources that are already operating within a cloud computing environment.

An enterprise-wide migration to the public cloud may involve thousands of workloads. As a result, the selection and prioritization of multiple software applications for migration to the cloud is a fundamental challenge faced by enterprises. Prioritization is often addressed by first selecting software applications that are most easily migrated. Other applications and software resources are addressed later. However, this approach oversimplifies the prioritization and does not permit a user to customize the rankings based on other factors such as business value that may vary in importance depending on the business function provided by the software.

Tools that provision and manage infrastructure allow an enterprise to specify the entire rollout of multiple applications on the cloud using "Infrastructure-as-Code" (IaC). Today, with IaC, the infrastructure details are specified in a language and the code instructions defined in that language are then run by a tool. With the entire infrastructure and operational characteristics of an application stored as code in a source code repository, versioning, tracking and managing the infrastructure can be achieved with greater accuracy using fewer resources. However, current approaches require extensive training and experience to generate IaC. As a result, engineers must manually write the code instructions to specify the details of the infrastructure before the software resources are deployed to the cloud. Further, it is difficult to find engineers with the required skills.

Maintaining compliance with regulatory and security requirements is critically important but often a difficult challenge when migrating software resources to the cloud. One problem is that the current approaches to meeting compliance standards generally lack automation. Further, compliance checks are traditionally performed after a resource is deployed in the cloud. This increases the possibility that a compliance violation will occur. Such occurrences can cause serious harm to an enterprise. For example, depending on the application, a security breach created because a deployed-resource did not comply with the necessary security requirements can result in the theft of highly confidential enterprise and/or personal information including financial or medical information.

SUMMARY OF INVENTION

In some aspects, the systems, apparatus and methods described herein are employed to automate processes used to create and deploy infrastructure-as-code. In various embodiments, these approaches provide a migration of software resources to the cloud in a manner that is more efficient than prior approaches. Further, in some embodiments, the migration-process has improved compliance capabilities including an ability to run compliance checks in advance of a resource being deployed to a live environment operated in the cloud.

According to one aspect, a method of cloud-migration planning includes a user-customizable application scoring process. In various embodiments, the method provides a sequence for migration based on a plurality of factors. Each of the factors can be assigned an individual weight customized by the user. Some embodiments include a graphical user interface that identifies the factors, allows for a user adjustment to the factors and displays the relative scoring of various applications that results from the customized weighting.

According to another aspect, a decision engine is employed to automate code generation. According to these embodiments, code instructions that specify the details of the infrastructure are generated automatically. This provides a much simpler, more efficient, less error prone, and less labor intensive approach.

According to another embodiment, a compliance check is done in the process of creating the resource before the resource is deployed. The compliance checks can be performed automatically when the code is first run using a set of rules specifically established for the enterprise and the application. According to one embodiment, one or more alerts will issue and the resource will not be deployed when code fails the compliance check. Thus, protecting the enterprise from the risk created when the non-compliant code is deployed in the live environment.

Further, a common set of compliance rules can be applied both for the pre-deployment compliance check and on-going compliance checks of the resources post deployment. According to one embodiment, the post-deployment checks can be automatically performed on a periodic basis (for example, hourly) and/or when a specific event occurs (for example, when a server is created). In a further embodiment, the same rule-base employed in creating the resource is applied in the live environment in which the resource is utilized. This approach assures that compliance requirements are maintained in a manner that is consistent with the requirements established by the enterprise during the development process, post-deployment.

According to a first aspect, a computerized method of prioritizing a plurality of software applications for a migration to a cloud computing environment operated for an enterprise is provided. According to some embodiments, the method includes acts of: (a) receiving a first set of user inputs via a graphical user interface, the first set of user inputs including a selected importance of each of a plurality of characteristics concerning a first software application selected from the plurality of software applications; (b) establishing a first score for the first software application based on the first set of user inputs, the first score including a score quantifying a value to the enterprise of the application and a score quantifying a complexity of migrating the application; (c) rendering in the graphical user interface a graphical scoring grid including a business value scale and an application complexity scale, the graphical scoring grid configured to display a plurality of icons each representing one of the plurality of software applications, respectively; (d) locating an icon representing the first software application within the graphical scoring grid based on the first score; (e) repeating acts (a)-(d) for each of the plurality of software applications; and (f) selecting a set of software applications from among the plurality of software applications for a migration-wave to the cloud computing environment based on the scores for the respective software applications.

According to a second aspect, a system includes a pipeline configured to deploy infrastructure-as-code to a cloud computing network for an enterprise. According to some embodiments, the system includes a survey module, an application scoring module and a weighting module. In one embodiment, the application scoring module is configured to receive information concerning a value to the enterprise of a software application and a complexity of migrating the software application to the cloud computing network. Further, the application scoring module is configured to determine a default score for the software application based, at least in part, on the information received by the survey module. The weighting module is configured to receive weights assigned by the enterprise for each of a plurality of characteristics concerning the software application, respectively, the weights reflective of an understanding by the enterprise of at least one of the value to the enterprise of the software application and the complexity of migrating the software application. According to this embodiment, the application scoring module is configured to generate a customized score for the software application based on an adjustment to the default score resulting from the weights.

According to a further embodiment, the system includes a wave planning module configured to employ the customized score to locate the software application in a selected one of a plurality of migration waves. In one embodiment, the wave planning module is configured to locate the software application in a first migration-wave as a result of the default score. According to a further embodiment, the wave planning module is configured to also locate the software application in a second migration-wave as a result of the customized score, the first migration wave different than the second migration wave.

In still another aspect, a non-transitory computer-readable medium is provided that includes contents that cause a processing device including a processor, a memory coupled to the processor and a display coupled to the processor to perform a method of prioritizing a plurality of software applications for a migration to a cloud computing environment operated for an enterprise. In some embodiments, the method includes acts of: (a) receiving a first set of user inputs via a graphical user interface, the first set of user inputs including a selected importance of each of a plurality of characteristics concerning a first software application selected from the plurality of software applications; (b) establishing a first score for the first software application based on the first set of user inputs, the first score including a score quantifying a value to the enterprise of the application and a score quantifying a complexity of migrating the application; (c) rendering in the graphical user interface a graphical scoring grid including a business value scale and an application complexity scale, the graphical scoring grid configured to display a plurality of icons each representing one of the plurality of software applications, respectively; (d) locating an icon representing the first software application at a location within the graphical scoring grid based on the first score; (e) repeating acts (a)-(d) for each of the plurality of software applications; and (f) selecting a set of software applications from among the plurality of software applications for a migration-wave to the cloud computing environment based on the scores for the respective software applications.

As used herein, the term "cloud computing" refers to a model for enabling ubiquitous, convenient, on-demand network access to a shared pool of configurable computing resources (e.g., networks, servers, storage, applications, and services) that can be rapidly provisioned and released with minimal management effort or service provider interaction.

As used herein, the term "infrastructure-as-code" refers to management of infrastructure (networks, virtual machines, load balancers, and connection topology) in a descriptive model, using the same versioning tools as software development teams use for source code.

As used herein, the term "pipeline" refers to a software construct of a series of steps in the software delivery process, such as building, testing infrastructure definition, provisioning infrastructure, testing software, and approving the deployment of software into cloud computing environments. Those of ordinary skill in the art will recognize that one or more of the steps may be automated. For example, the series of steps may include automatic builds and/or automated testing.

As used herein, the term "live environment" refers to an operational cloud environment where infrastructure resources can be consumed.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 4 illustrates a flow diagram of a process employed to organize a migration of software resources to the cloud in accordance with one embodiment;

FIG. 5 illustrates a survey employed for cloud-migration in accordance with one embodiment;

DETAILED DESCRIPTION

Figure 1:
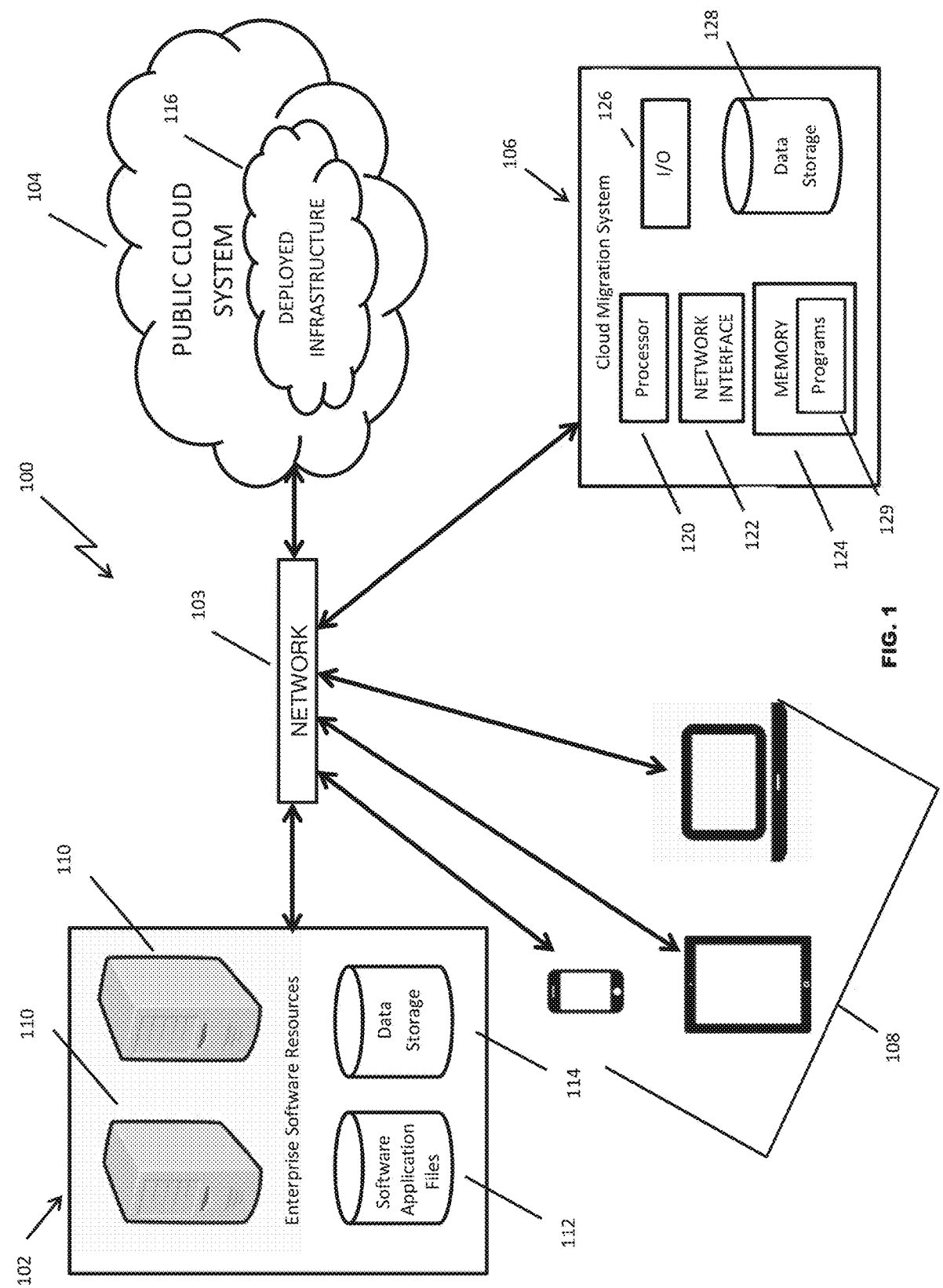
FIG. 1 illustrates a system including a network operating environment for cloud-migration in accordance with one embodiment.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Referring now to FIG. 1, a system 100 for deploying resources to the cloud is illustrated in accordance with various embodiments. According to the illustrated embodiment, the system 100 includes enterprise software resources 102, a network 103, a public cloud system 104, a cloud migration system 106 and a plurality of user devices 108. In various embodiments, the system 100 is employed to migrate the enterprise software resources 102 to the public cloud system 104 as described in greater detail below.

In general, the enterprise software resources 102 include the software and associated physical infrastructure (such as servers and networks) that allow an enterprise to provide software-based tools and services to users. Depending on the embodiment, the users can include any one of or any combination of employees of the enterprise and/or various types of third-party user such as end users, vendors, contractors and customers. In the illustrated embodiment, the enterprise software resources 102 include servers 110, software applications files 112 and data storage 114. Typically, the servers 110 provide physical infrastructure employed to deliver various service-functionality in a centralized manner to client devices located remotely from the servers 110. The servers 110 can include database servers, file servers, mail servers, print servers, web servers, game servers and application servers as some examples.

The software application files 112 can include any quantity and type of file that are executed to provide services. Examples include a web application used by the enterprise for marketing and/or sales, a backend processing workflow application employed by the enterprise to process claims and a batch processing pipeline application employed for digital asset management within the enterprise. The preceding provides only a small set of representative examples. Other example files-types and applications include content files such as images, audio, video or other content, applications used to log, query, index, map or tag software resources and associated activity.

According to some embodiments, the data storage 114 includes one or more databases. Depending on the embodiment, the databases can include any of a relational database, object-oriented database, unstructured database, or other database. Further, the databases can be included in any aspect of a memory system, such as in RAM, ROM or disc, and may also be separately stored on one or more dedicated data servers included in the enterprise software resources 102. The databases included in the data storage 114 can store a variety of types of information depending on the embodiment. For example, the information can include any of the file types identified in the immediately preceding paragraph.

In general, the network 103 can include either or both of local-area networks (LANs), wide area networks (WANs), wireless communication, wired communication and may include the Internet. According to a further embodiment, the network 103 provides access to one or more remote devices, servers, application resource management and/or data storage systems. For example, the network 103 can allow communication between any of the enterprise software resources 102, the public cloud system 104, the cloud migration system 106 and the plurality of user devices 108. In general, the system 100 provides for communication of the illustrated components with one another and/or with any of the other resources and devices coupled to the network 103. Communication can occur using any of Wi-Fi networks, Bluetooth communication, cellular networks, satellite communication, and peer-to-peer networks available either alone or in combination with one another via the network 103. Depending on the embodiment, the network 103 may be any type and/or form of network known to those of ordinary skill in the art capable of supporting the operations described herein. Thus, other communication protocols and topologies can also be implemented in accordance with various embodiments.

According to some embodiments, the public cloud system 104 is a cloud environment owned by a third-party cloud provider and accessible to the public. The resources on public clouds are generally offered to cloud consumers for a fee and are setup to allow an enterprise or other user to host the applications and associated infrastructure on the public cloud owned and operated by the third-party provider. Amazon Web Services (AWS) and Google Cloud Platform two well-known examples of public-cloud systems. The public cloud system 104 can also be referred to as a public cloud network.

In the illustrated embodiment, the public cloud system 104 includes deployed infrastructure 116. In various embodiments, the deployed infrastructure 116 can include applications and related infrastructure traditionally operated using the enterprises' own resources that are defined as source code for operation. In general, the approach allows the enterprise to provision and relinquish cloud resources on an as-needed basis without the need to provide or support the hardware required to deliver the service-functionality provided by the software applications.

In various embodiments, the cloud migration system 106 provides the interface and tools for planning, provisioning and deploying the enterprise software resources 102 to the public cloud system 104. In the illustrated embodiment, the cloud migration system 106 includes a processor 120, a network interface 122, a memory 124, I/O 126 and data storage 128. The memory 124 includes at least one program 129. Depending on the embodiment, the cloud migration system 106 can include one or more of a variety of computing devices such as a general purpose computer such as a PC, a laptop, a tablet computer or other computing device. The network interface 122 is employed for communication between the cloud migration system 106 and other elements connected to the network 103 including the enterprise software resources 102, the public cloud system 104 and the user devices 108.

The memory 124 can store the programs 129 that when executed by the processor 120 render a user interface in a display included in the cloud migration system 106. The user interface is employed by the user to operate the cloud migration system 106 to perform steps to plan, provision and deploy the enterprise software resources 102 to the public cloud system 104. The I/O 126 can include any of the display in which a graphical user interface (GUI) is presented to the user, a touchscreen controller where, for example, the display is a touchscreen display, or alternatively, a trackpad or mouse used to move a cursor within a GUI. According to further embodiments, the I/O can include an audio system employed with a speech recognition system to allow hands-free interaction with the GUI.

According to some embodiments, the data storage 128 stores information concerning various aspects of the enterprise software resources 102 that are scheduled to be deployed in the public cloud system 104, for example, survey-data, AppCodes, derived values, migration wave planning information, compliance rules and information concerning the enterprise. Depending on the embodiment, the data storage 128 can include any of a relational database, object-oriented database, unstructured database, or other database. Further, the data storage 128 can be included in any aspect of a memory system, such as in RAM, ROM or disc, and may also be separately stored on one or more dedicated data servers included in the cloud migration system 106.

The components included in the cloud migration system 106 can be coupled by one or more communication buses or signal lines. The communication buses can be used for the communication of instructions/commands and data between the illustrated components and between the illustrated components and other components included in the device depending on the embodiment.

The plurality of user devices 108 can include any type of computing device suitable for communicating with the deployed infrastructure 116 via the network 103 and the public cloud system 104. Accordingly, the plurality of user devices of can include one or more of a variety of computing devices such as a general purpose computer such as a PC, a laptop, a tablet computer or other computing device.

Figure 2:
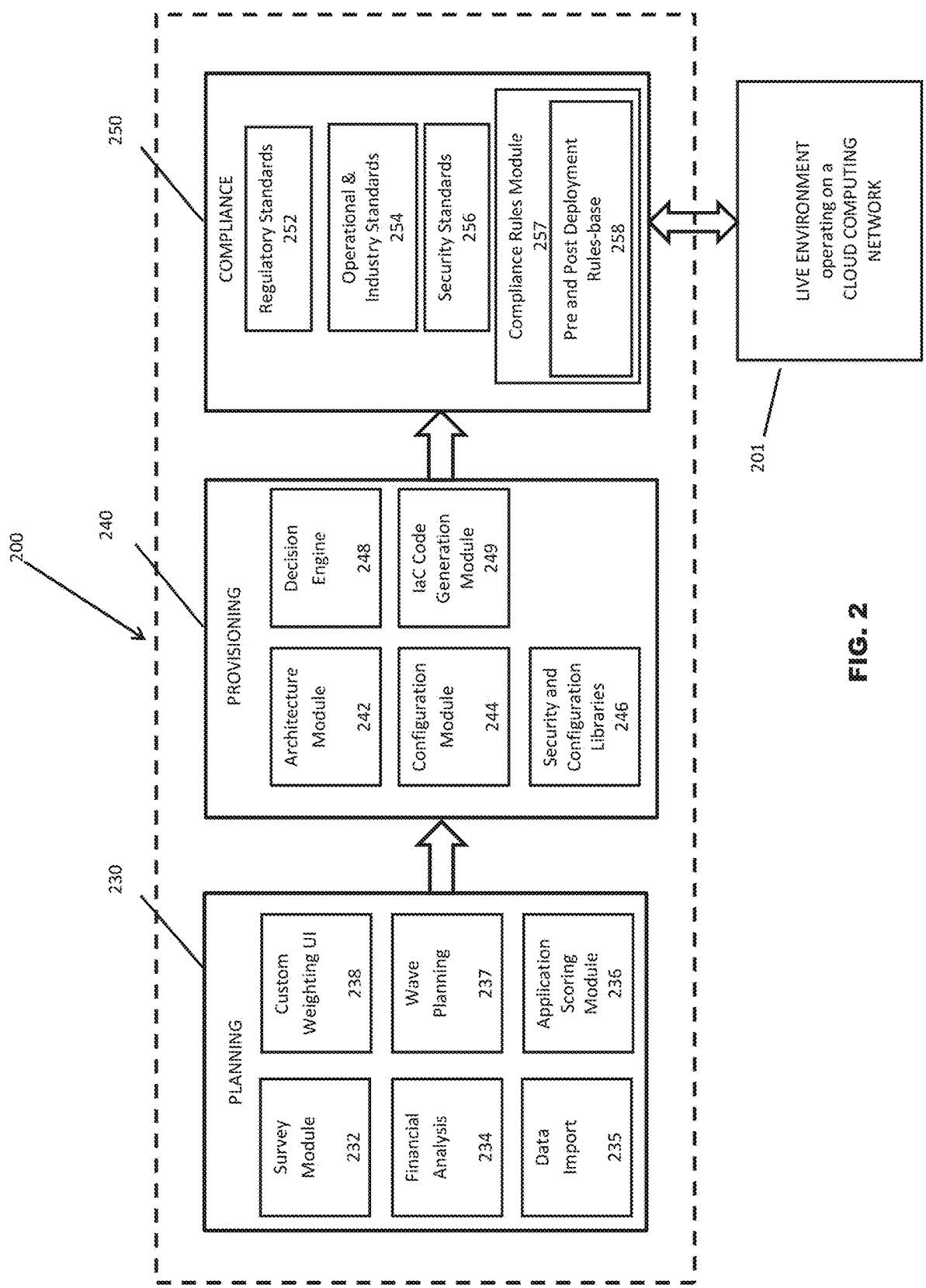
FIG. 2 illustrates a cloud-migration processing pipeline in accordance with one embodiment.

Referring now to FIG. 2, a processing pipeline 200 is illustrated in accordance with one embodiment. According to various embodiments, the processing pipeline 200 is employed in a process of provisioning and deploying infrastructure-as-code to a live environment 201. The live environment 201 operates on a cloud computing network according to the illustrated embodiment. Depending on the embodiment, the cloud computing network can be a public cloud computing network, a private cloud computing network or a hybrid cloud computing network that includes some software resources deployed on a public cloud network and others deployed on a private cloud network.

The processing pipeline 200 includes planning resources 230, provisioning resources 240 and compliance resources 250. In some embodiments, the overall process executed with the processing pipeline 200 begins with the processing pipeline 200 receiving and processing information with the planning resources 230 to generate migration-wave planning for resources to be deployed to the live environment 201. The migration-wave planning information is then processed using the provisioning resources 240 to generate IaC source code. The IaC source code is then processed using the compliance resources 250 for deployment to the live environment 250. According to various embodiments, the compliance resources 250 can also be employed post deployment to process the IaC source code operating in the live environment.

In the illustrated embodiment, the planning resources 230 include a survey module 232, a financial analysis module 234, a data import module 235, an application scoring module 236, a wave planning module 237 and a custom weighting user interface (UI) module 238. The provisioning resources include an architecture module 242, a configuration module 244, a security and configurations libraries module 246, a decision engine 248 and an IaC code generation module 249. Further, the compliance resources 250 include a regulatory standards module 252, an operational and industry standards module 254, a security standards module 256 and a compliance rules module 257. Further, according to the illustrated embodiment, the compliance rules module 257 includes a pre and post deployment rules-base 258.

The survey module 232 receives survey data concerning the software resources to be processed by the pipeline 200, for example, survey data provided by an enterprise concerning the enterprise software resources 102 illustrated in FIG. 1. In some embodiments, the survey module 232 generates the surveys employed to elicit the responses (e.g., the survey data) provided in response to the survey. Depending on the embodiment, the survey data provides information concerning the software applications included in the enterprise software resources 102 such as information about a complexity of the software application; a value of the software application to the enterprise; an infrastructure employed by the software application; operational patterns exhibited by the software application; a size and complexity of the transactions processed by the software application; and individuals responsible for the software application within the enterprise. The specific categories of information that are provided to the survey module 232 can vary depending on the embodiment. However, in general, the survey module 232 processes information concerning the value to the enterprise of the software application and a complexity of migrating the software application to the live environment 201. For example, according to one embodiment, the survey data provides information including at least one of a data security classification for data in the software application, a data resiliency requirement for data in the software application, a degree of coupling between servers employed by the software application and a degree of dependency between the software application and at least one other software application employed by the enterprise.

The financial analysis module 234 receives data concerning the cost to migrate the enterprise software resources 102 to the live environment 201. According to some embodiments, the financial analysis module 234 provides comparisons and/or rankings of the migration costs of multiple software resources included I the enterprise software resources 102. According to one embodiment, the financial analysis module 234 provides a financial analysis of the cost of migrating and operating an enterprise software resource on the cloud computing network with the cost of an alternative in which the resource continues to operate using infrastructure owned by the enterprise. The preceding can allow an enterprise to determine a return on investment (ROI) of a cloud migration. The ROI information can be evaluated to determine whether a migration of all or only some of the enterprise software resources 102 is supported based on the enterprise needs and the associated ROI.

The data import module 235 imports data concerning existing infrastructure and applications, for example, data that identifies various software and hardware components that support the enterprise software resources 102 of FIG. 1 as well as the interrelationships of the various software and hardware components. According to some embodiments, the information is imported from a configuration management database (CMDB). According to other embodiments, the information is imported from a discovery tool such as CloudScrape by RISC or Amazon Discovery Tool. According to other embodiments, some information is imported from a CMDB while other information is imported using a discovery tool.

The application scoring module 236 processes data received by the survey module 232 to determine a score associated with each of the software applications included in the enterprise software resources 102. In some embodiments, the application scoring module 236 determines a score concerning the value to the enterprise of a software application and a complexity of migrating the software application to the cloud computing network. In some embodiments, the application scoring module 236 assigns an AppCode to a software application. In general, the AppCode provides a unique identifier used to identify a set of information technology resources that are grouped together for a migration. For example, the enterprise may use a software application that includes multiple environments (development/test/production) and multiple tiers (web/application/database). In this example, a single AppCode can be used to address each of the elements for this software application. According to one embodiment, the application scoring module 236 receives the survey data and generates a default score for a software application. In further embodiments, the planning resources allow a user-customization of the default score as described below.

According to some embodiments, the wave planning module 237 operates to prioritize software applications for wave planning for a migration to the live environment 201 based on the scores provided by the application scoring module. According to further embodiments, the application scoring module provides a scoring grid to illustrate to the user of the cloud migration system 106 a visual representation of the location a software application in the migration wave-plan. According to a further embodiment, one or more icons representing respective AppCodes are displayed together in the scoring grid as is described in greater detail herein with reference to FIGS. 3A-3B. The wave planning module 237 provides the prioritized migration wave plan to the provisioning resources in accordance with one embodiment.

In general, the custom weighting UI module 238 allows users of the cloud migration system 106 of FIG. 1 to adjust the score of a software application provided by the application scoring module, for example, to customize the score for the software application. According to various embodiments, the custom weighting UI module 238 provides a graphical user interface including a set of user inputs rendered in a display included in the cloud migration system 106 to allow users to adjust scores. The location of the software application in a migration-wave plan can be adjusted when the user adjusts a score using the custom weighting UI module 238.

Referring to the provisioning resources 240, the architecture module 242 defines the foundational cloud architecture, for example, the networks, applications, servers, cloud accounts (e.g., AWS accounts), authentication requirements and authorizations used to deploy the software resource for operation in the live environment 201. For example, the architecture module 242 can define the cloud architecture using information provided by either or both of the survey module 232 and the data import module 235. In some embodiments, the architecture module 242 generates a cloud deployment pattern selected by the enterprise. As just a few examples, an enterprise may select a cloud deployment pattern from among EC2 persistence, EC2 non-persistence, serverless and container.

The configuration module 244 configures the cloud resources and services based on the cloud architecture requirements of the software resource that is being deployed. Depending on the type of resource that is being deployed, the configuration module 244 can include configuration settings for scaling the application, launch configurations for one or a plurality of instances including instance types and profiles, the software configuration and the manner in which configuration changes are deployed for the application. Different characteristics and different combinations of characteristics concerning the configuration can be addressed by the configuration module 244 depending on the embodiment. In some embodiments, the configuration module 244 configures a code repository for inclusion in a continuous integration and continuous delivery (CI/CD) process which is employed in deploying the software application to the live environment 201.

The security and configurations libraries module 246 includes files, programs, routines, scripts and/or functions that can be employed with IaC source code, for example, to provide the required security and configuration for the software application in the live environment 201. In various embodiments, the resources provided by the security and configurations module 246 allow a more seamless deployment of infrastructure to the live environment by providing prepared software elements used to implement known functionality for the software application operating in the live environment 201. For example, security compliance can be addressed using redefined and custom rules for security standards and regulatory compliance frameworks applicable to the software application.

In various embodiments, the decision engine 248 is employed to generate a cloud deployment model for the software application. In some embodiments, the decision engine 248 generates the cloud deployment model based on one or more of survey data provided by the enterprise for the software application, organizational standards for the enterprise, server inventory data for the software application and learned approaches for creating cloud deployment models for the enterprise. According to some embodiments, the survey data is provided by the survey module 232 and the server inventory data is provided by the data import module 235. Because most cloud deployments involve multiple enterprise software resources, the decision engine can be trained to use information and approaches that are consistently applied by an enterprise for like-resources. For example, the enterprise may have a policy to deploy applications using a server-based compute infrastructure when possible because they find it more cost effective and easier to manage applications in this manner.

In one embodiment, the decision engine 248 uses the deployment pattern provided by the architecture module 242 to generate a predicted cloud deployment model. In a further embodiment, the predicted cloud deployment model is changed and/or customized when a change to one or more deployment parameters concerning the software application is received. In general, deployment parameters include information about the software application that is used to define the IaC. For example, a change by the enterprise to an amount of memory required for the application can change the cloud deployment model. As another example, the deployment parameters can be changed to provide a storage container for audit purposes. According to various embodiments, the enterprise employs the decision engine to customize the cloud deployment model for the software application.

The IaC code generation module 249 converts the cloud deployment model to IaC source code defined in a selected configuration language. According to one embodiment, the IaC source code is defined in HashiCorp Configuration Language (HCL) which is processed by the Terraform™ tool converting the HCL to cloud resources based on the IaC source code definition. According to another embodiment, the IaC source code is defined in a YAML configuration language which is processed by a tool converting the YAML defintiion to cloud resources based on the IaC source code definition. Thus, in some embodiments, the IaC code generation module operates to generates IaC source code defined in any one of a plurality of configuration languages to cloud resources. The IaC code generation module 249 can also operate to check the IaC source code into the code repository included in the pipeline 200.

The compliance resources 250 operate to apply a rules-base to the IaC source code to prevent out-of-compliance infrastructure deployments and to monitor the live environment 201. Thus, the compliance resources are employed for both pre and post deployment compliance checks. Depending on the embodiment, various types of rules are included in the pre and post deployment rules-base 258. According to the illustrated embodiment, the standards addressed by the rules-base include regulatory standards, operational and industry standards and security standards. According to some embodiments, the compliance resources 250 are configured to perform static testing of the infrastructure-as-code defined in any of a plurality of configuration languages. For example, in one embodiment, the plurality of configuration languages includes at least a YAML configuration language and a HCL configuration language.

In one embodiment, the regulatory standards module 252 includes standards concerning compliance with regulatory requirements such as Sarbanes-Oxley (SOX), or those found in financial services such as banking and money management, the operational and industry standards module 254 includes standards concerning industry standards such as PCI data security standards used in the credit card processing industry, and the security standards module 256 includes standards concerning the nature and type of security requirements, for example, the protection of usernames and passwords used with a software application. According to one embodiment, the rules included in the rules-base are automatically updated based on updates to the relevant standards. For example, the regulatory rules can update automatically as new regulations are received by the regulatory standards module 252.

According to some embodiments, the compliance rules module 257 includes a rules engine that runs the compliance rules found in the pre and post deployment rules-base 258 against the IaC source code. According to further embodiments, IaC source code is not deployed to the live environment 201 if the IaC source code fails to pass requirements of the compliance rules. According to one embodiment, the failure to pass a single compliance rule is enough to prevent the IaC source code from being deployed. In various embodiments, the compliance rules module 257 operates to provide continuous compliance-monitoring of the IaC source code operating in the live environment 201. For example, the compliance rules module 257 can periodically monitor the IaC source code using the rules-base 258 in an automated manner. The compliance rules module 257 can also provide automated reporting of results of the compliance monitoring.

Figure 3A:
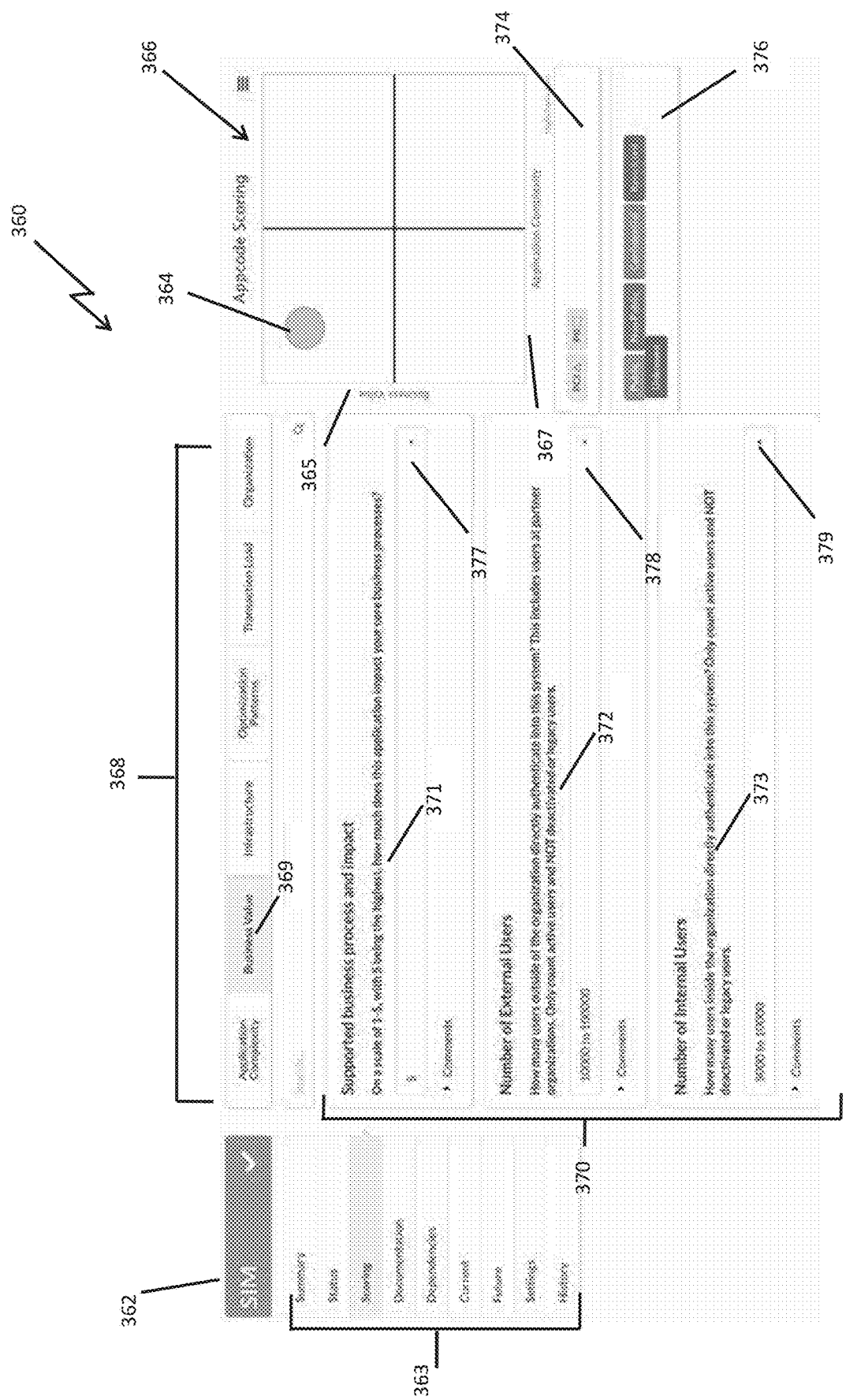
FIGS. 3A-3B illustrate user interfaces in accordance with one embodiment.
Figure 3B:
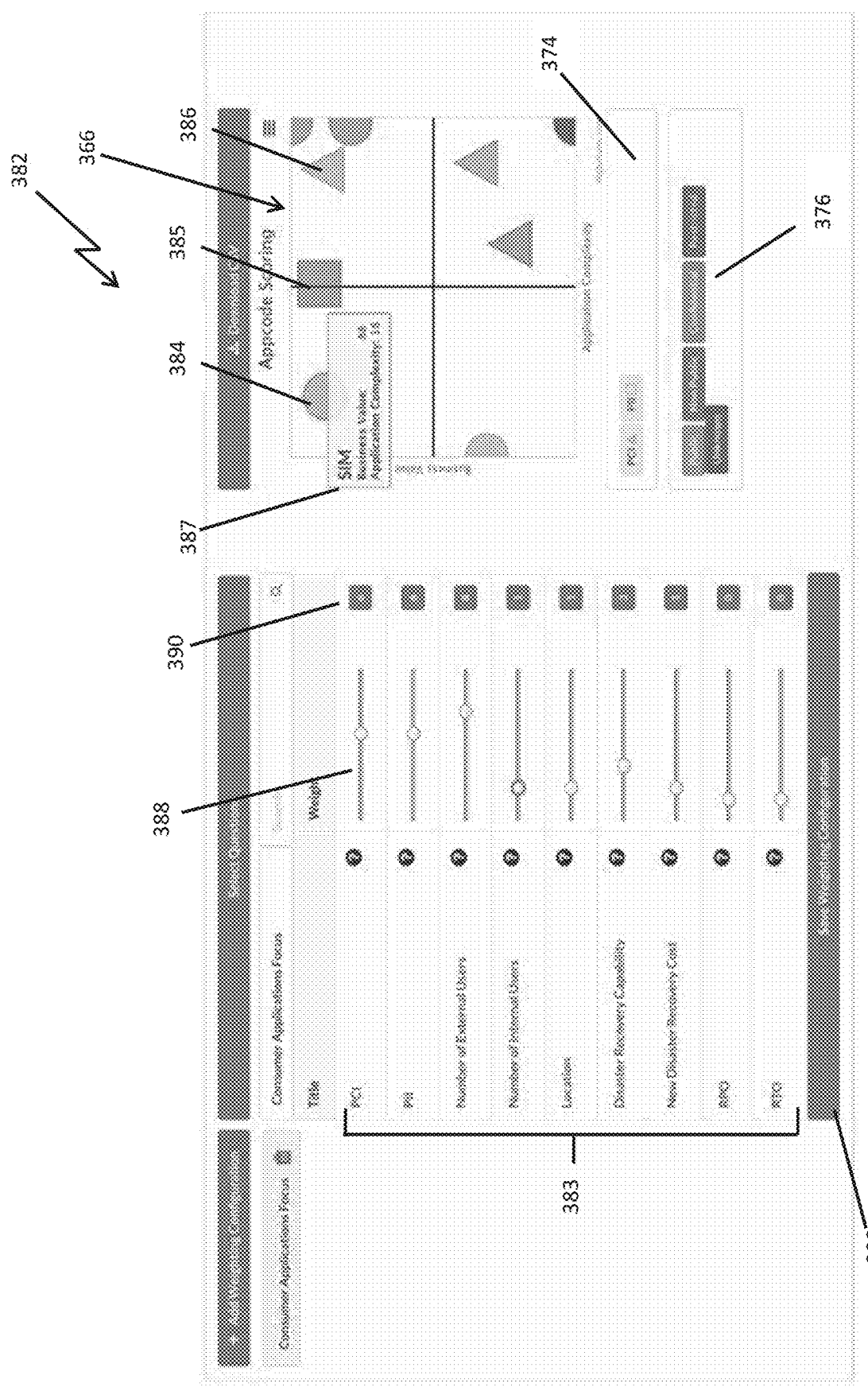

Referring now to FIGS. 3A and 3B, user interfaces employed by one or more users to generate a score used for migration wave-planning are illustrated in accordance with various embodiments. The user can employ the computing resources included in the system 106 to generate a prioritized migration wave-plan for the enterprise software resources 102. For example, the user interfaces can be generated by a software tool operating as a part of the cloud migration system 106. The software tool can include one or more programs (e.g., programs 129 of FIG. 1) stored in the memory 124 that when executed by the processor 120 render the user interface in a display included in the cloud migration system 106. The embodiments described with reference to FIGS. 3A and 3B illustrate a series of display objects of a graphical user interface presented in the display to allow a user to interact with the cloud migration system in a planning process for cloud migration. In various embodiments, the user employs the cloud migration system to customize the prioritized wave migration plan based on information specific to the enterprise whose software resources are being migrated to the cloud.

Referring now to FIG. 3A, a user interface 360 is illustrated in accordance with various embodiments. In the illustrated embodiment, the user interface 360 is rendered in a GUI. The user interface 360 includes an AppCode ID 362, a main menu 363, an AppCode icon 364, a scoring grid 366, a menu of planning-information categories 368 and a plurality of planning-information questions 370. The scoring grid 366 employs a standards legend 374 and a data security legend 376.

According to the illustrated embodiment, a first planning-information category 369 "Business Value" is selected from among the plurality of planning-information categories. The other planning-information categories include: Application Complexity; Infrastructure; Optimization Patterns; Transaction Load and Organization. In general, these planning-information categories identify the areas that are relevant to scoring the AppCode for migration wave-planning. In the illustrated embodiment, the planning-information questions 370 include a first question 371 concerning the "Supported business process and impact," a second question 372 concerning the "Number of External Users," and a third question 373 concerning the "Number of Internal Users." Further, each of the planning-information questions 370 includes an associated pull down menu. As illustrated, the first question 371 is associated with a first pulldown menu 377, the second question 372 is associated with a second pulldown menu 378 and a third question 373 is associated with a third pulldown menu 379.

The AppCode ID 362 is the unique identifier for the set of information technology resources required to support one or a plurality of enterprise software resources selected from the enterprise software resources 102. According to one embodiment, the enterprise selects the unique identifier for a software application. The combination of information technology resources grouped within an AppCode can vary based on multiple considerations and new AppCodes can be created by an enterprise in accordance with various embodiments. In a first example, the AppCode for an application that includes a first server that is dependent on a second server may include both servers in the same AppCode where diagnosing an issue requires bringing both servers down and then back up at the same time. In this example, the coupling between the servers provides the rationale to include the two servers in a single AppCode. As a second example, where 90% of the data processing for an application involves PCI data, 10% of the data is not PCI data and the majority of external applications depend on the 10% of non PCI data, the processing components and data storage may be separated across multiple AppCodes. In this example, the data security classification of data processed for the application is used to determine the AppCode assignment(s). As a third example, when all of the servers for an application cannot be cutover at the same time, separate AppCodes are created for different groups of servers, respectively, that can be cutover together. Here, the cutover methodology and requirements are used to determine AppCode assignment(s) for the components within the application.

The main menu 363 provides a list of different functions available for planning a migration of resources included in an AppCode. According to the illustrated embodiment, the main menu includes the following functions: Summary; Status; Scoring; Documentation; Dependencies; Current; Future; Settings and History. A selection of the Summary function allows the user to edit the description and account information concerning the selected AppCode. The Status function allows a user to track multiple dimensions of the AppCode's migration status. According to one embodiment, the tracked dimensions include Overall Scope, Timeline, Resources and Budget. In a further embodiment, the icon for the AppCode will be color coded depending on the overall migration status, for example, red if the overall status is set to stalled, amber if the project needs attention and green if the project is on track. A selection of the Documentation function allows the user to upload documentation related to the migration of the selected AppCode. The Dependencies function allows the user to define relationships between the AppCode and other AppCodes. The Current function allows the user to document the servers for this AppCode in the current data centers while the Future function allows the user to document a future state of the public cloud infrastructure including the resources for the AppCode. The Settings function allows users to delete AppCodes and manage user access and permissions, for example, user access to edit and access AppCodes. The History function allows users to track a revision history of AppCodes.

In general, the scoring grid 366 provides a graphical representation of the location of enterprise applications within the migration wave-plan based on AppCode scoring. The scoring grid 366 includes a first axis 365 based on the value of the application to the enterprise. The scoring grid includes a second axis 367 based on the complexity of migrating the application from the enterprise software resources 102 to the public cloud 104. In the illustrated embodiment, the first axis 365 (a y-axis) is labeled "Business Value" and the second axis 367 (an x-axis) is labeled "Application Complexity." The scoring grid 366 is divided into four quadrants that are populated with AppCode icons for those AppCodes for which a score has been generated. For example, in one embodiment, the application scoring module 236 of FIG. 2 generates a score for a selected AppCode. An AppCode icon is located in the scoring grid 366 based on the score. As illustrated in FIG. 3A, the AppCode icon 364 represents the "SIM" AppCode which is located in the upper left quadrant of the scoring grid 366. In one embodiment, resources included in the SIM AppCode are included in the initial migration wave because the AppCode has a high business value and a low application complexity.

The AppCode icons can be rendered in a manner that conveys information in addition to the relative score of the application. For example, the shape of the AppCode icon can vary based on the standards legend 374. In the illustrated embodiment, the standards legend includes a triangle-shape used to represent an AppCode for an application that includes data required to meet PCI (payment card industry) data security standards, for example, those applications that handle credit card information. The standards legend also includes a square-shape used to represent an AppCode for an application that includes data required to meet PII (personally identifiable information) data security standards, for example, those applications that handle information that could be used to reveal a person's identity such as names, social security numbers and dates of birth. The AppCode 364 is represented as a circle which is the default icon-shape because the SIM AppCode does not concern either an application that processes PCI or an application that processes PII data. The color of the AppCode icon can vary based on the data security requirements of the data handled by the application represented by the AppCode. In one embodiment, the color code provided by the data security legend includes green to represent Public Data, blue to represent Non-Public but non-confidential data, orange to represent Confidential data, red to represent Restricted data and Purple to represent an AppCode for which the data security requirements are unknown. For example, data in the Confidential category can include data that is restricted to internal use or otherwise approved access while data in the Restricted category can include extremely sensitive data that will impact the enterprise, its users or its clients if made available such as unreleased financial information and sensitive HR records.

In the illustrated embodiment, the Scoring function is selected from the main menu 363. The selection of the Scoring function results in a display of the survey data, for example, the survey data provided by the survey module 232. According to one embodiment, survey responses are automatically imported for display when the Scoring function is selected. According to another embodiment, the user selects the Scoring function and then uses the GUI to manually enter the survey data. The selection of the Scoring function results in the display of the menu of planning-information categories 368. In one embodiment, questions in each of these categories are included in the survey processed by the survey module 232. The responses to the questions provide the survey data used to generate the score for the AppCode.

FIG. 5 illustrates a survey 580 employed by the cloud migration system 102 for migration planning in accordance with one embodiment. As illustrated, the survey 580 illustrates only a portion of an overall survey that is provided by the survey module 232 for use in planning the migration of the enterprise software resources 102 to the public cloud 104. The survey 580 includes a plurality of questions. Each question is numbered. In addition, the questions are organized to include a Title, the Survey Question itself and a Category. The Title provides a form of identification concerning the detailed subject matter of the question, while the Survey Question provides the question in full. For example, question number 61 is entitled "Operational Complexity" and includes the survey question "What is the operational complexity of the application regarding number of incidents, frequency of releases, etc.?" Question 61 is included in the category "Application Complexity." The survey questions directed to application complexity that also appear in FIG. 5 include questions concerning each of the "Environment Migration Priority," the "Application Size," the "Development Team Size," the "Business Continuity Plan," and the "DR [disaster recovery] Second Instance." In practice, the number of survey questions can include anything from a few to dozens of questions directed to each of a variety of categories.

For example, in various embodiments, the survey 580 includes a plurality of questions (organized in the manner shown in FIG. 5) in a plurality of categories. In one embodiment, the categories include each of Application Complexity, Business Value, Infrastructure, Optimization Patterns, Transaction Load and Organization. FIG. 5 also illustrates survey questions directed to business value including questions concerning each of the "Annual Cost Reduction," the "Current On Prem Storage and Compute [costs]," the "Projected AWS Cost," the "Net Profit or Loss," and the "Supported business process and impact."

The questions concerning infrastructure can address the data storage and the processing structure of the application, the hardware requirements and other aspects of the infrastructure used by the application. For example, items such as: the identification of the operating systems used by the application; required response times needed for users of the application; types of database(s) used by the application; the number of servers used by the application; the typical number of CPUs the server uses during production processing; the memory used by a typical server during processing in production; and the average network usage for the system on a daily basis, to list just some of the subjects addressed by the survey concerning the infrastructure.

The questions concerning the optimization patterns can address the nature of the processing performed by the application. For example, items such as: whether the application employs Extract-Transform-Load (ETL) type processing; the timing of when the application runs; and whether the application is a candidate for containerization, to list just some of the subjects addressed by the survey concerning optimization patterns. The questions concerning the transaction load can address items such as: the complexity of the transactions; the size of the transactions; and fluctuation in use of the application. The questions concerning the organization can address items such as: the unique identifier used by the enterprise for the application; contact information for the project lead at the enterprise; and contact information for the IT lead for the application.

Throughout the survey and within any one survey category questions can include questions that are best answered on a numerical scale and those that are best answered with a text answer. The survey 580 includes questions concern operating costs (for example, question 67 "what is the estimated annual cost reduction?"), questions that request a ranking or score (for example, question 71 "On a scale of 1-5, with 5 being the highest, how much does this application impact your core business processes?") and questions that request answers requiring a written reply (for example, question 63 "Roughly how large is this application? Base your answer on your best guess based on a variety of factors potentially including number of users, number of integrations amount of data etc.").

In the illustrated embodiment, the user interface 360 includes the plurality of planning-information questions 370 that concern the category selected by the user. Here, the questions concern the first planning-information category 369 "Business Value" selected from among the plurality of planning-information categories. In one embodiment, the survey data received from the survey module 232 populates the user interface 360 when the planning category is selected by the user. As will be apparent to those of ordinary skill in the art in view of the disclosure herein, the user interface can provide the user with an ability to view all of the questions in a selected planning category by scrolling, swiping or paging through the questions via the user interface 360. Therefore, although the illustrated embodiment illustrates the first question 371, the second question 372 and the third question 373 concerning Business Value, the remaining questions can be viewed as well (for example, other questions in the survey 580 in the business value category or a different category selected by the user).

In operation, a user can operate the user interface 360 to review the scoring attributes provided by the survey data for each question for each of the planning-information categories 368. Further, the user interface 360 also provides users with an opportunity to adjust the survey response data. In the illustrated embodiment, the first pull down menu 377 allows the user to adjust the response to the first question 371 "On a scale of 1-5, with 5 being the highest, how much does this application impact your core business processes?" The second pull down menu 378 allows the user to adjust the response to the second question 372 "How many users outside of the organization directly authenticate into this system?" to select a different range of values to identify the number of external users. The third pull down menu 379 allows the user to adjust the response to the third question 373 "How many users inside the organization directly authenticate into this system?" to select a different range of values to identify the number of internal users.

The entries provided here will impact the score for AppCode. As a result, the location of the AppCode icon 364 in the scoring grid 366 can be adjusted. The adjustment can also move the AppCode from a first migration wave to a second migration wave. According to one embodiment, changes made by the user to the answers to questions displayed in the user interface 360 update the AppCode scoring and location in the scoring grid 366 in substantially real time.

According to a further embodiment, the user interface 360 is employed to provide an interface for an initial manual input of survey data provided by the enterprise. According to this embodiment, the user interface 360 is automatically populated with the survey data once it is saved in the cloud migration system 106 following the initial manual entry. Thereafter, the user can modify the survey data as described above.

According to some embodiments, the user can further adjust the AppCode score by weighting the survey questions. FIG. 3B illustrates a user interface 382 for customized AppCode scoring in accordance with one embodiment. In general, the user interface 382 provides the user access to various system objects (for example, display objects) that convey information and allow the user to customize the AppCode scoring during the migration planning process. For example, the system objects can include functions such as tools for adjusting scoring, an icon display, a scoring display and a save or update button or other tools and visual references represented graphically. Accordingly, one or a plurality of display objects can be rendered for viewing and/or selection in the user interface 382 via voice commands, a touch input or other input such as a cursor rendered in the display.

According to the illustrated embodiment, the user interface 382 includes the scoring grid 366, the standards legend 374, the data security legend 376 and a plurality of titles 383 where each title concerns one of the survey questions (for example, as illustrated in FIG. 5). A plurality of AppCode icons are located in the scoring grid. For the purpose of this description, three of the plurality of AppCode icons are identified with reference numerals including a first AppCode icon 384, a second AppCode icon 385 and a third AppCode icon 386. The user interface also includes detailed scoring information 387 that is provided for a selected AppCode. In the illustrated embodiment, the user interface 382 also includes an adjustable display object 388, a survey-question weighting 390 and a save button 392.

The plurality of titles 383 can include the titles of any of the survey questions including questions directed to each of the respective categories. For example, in one embodiment, the plurality of titles includes titles concerning survey questions for each of Application Complexity, Business Value, Infrastructure, Optimization Patterns, Transactional Load and Organization categories. As illustrated, a separate adjustable display object 388 is provided along with a separate survey-question weighting 390. The adjustable display object 388 allows the user to adjust the weighting 390 for the associated survey question which is identified by the title. In the illustrated embodiment, the adjustable display object 388 includes a slider where a movement from left to right increases the weighting and movement from right to left decreases the weighting. However, different styles and types of display objects can be employed depending on the embodiment provided that the display object provides a tool to allow the user to make the adjustment. For example, selectable up/down or left/right arrows can be used to adjust weighting in other embodiments.

In the illustrated embodiment, the adjustable display object associated with the Title "Number of Internal Users" is selected and highlighted. Adjustment of this display object adjusts the weighting applied to the survey data elicited by the question "How many users inside the organization directly authenticate into this system?," the third question 373 illustrated in FIG. 3A. The numerical value of the weighting for this question adjusts as the display object 388 associated with the question is adjusted. According to one embodiment, the adjustment of the numerical weighting displayed by the survey-question weighting 390 occurs in substantially real time relative to the adjustment of the adjustable display object 388. The save button 392 is selected by the user to save the weighting configuration established by the adjustments. Although illustrated as a "button-style" display object, the act of saving a weighting configuration can be accomplished using a different style display object depending on the embodiment.

In various embodiments, changes to the weighting for one or more titles/questions result in a change to the AppCode scoring. For example, this can occur in response to the save button 392 being selected. According to one embodiment, the adjustment of the AppCode scoring resulting from a change in weighting occurs in substantially real time relative to the selection of the save button 392. In various embodiments, the detailed scoring information 387 is displayed to provide the user with quantified information concerning the AppCode scoring with the current weighting configuration (for example, the weighting configuration that was just saved using the save button 392).

In the illustrated embodiment, the first AppCode icon 384 represents the SIM AppCode. The detailed scoring information 387 indicates that the SIM AppCode has a Business Value score of "88" and an Application Complexity score of "18" under the current weighting configuration. As a result of the score, the SIM AppCode is located in the first migration wave because it is of high value to the business but has a low complexity to migrate to the cloud. In contrast, the second AppCode icon 385 represents an application that must meet PII data security standards (a square shape as provided for in the standards legend 374) and is color-coded red (not illustrated) to reflect the sensitive nature of the data included in the application. The scoring for the application represented by the second AppCode icon 385 reflects that while the business value is high, the application complexity is higher than the SIM AppCode. Consequently, the second AppCode icon 385 has a location in the scoring grid 366 that straddles the upper left and upper right quadrants of the grid 366. As another example, the third AppCode icon 386 represents an application that must meet PCI data security standards (a triangle shape as provided for in the standards legend 374) and is color-coded orange (not illustrated) to reflect the confidential nature of the data included in the application. The scoring for the application represented by the third AppCode icon 386 reflects that while the business value is high, the application complexity is higher than application represented by the second AppCode icon 385. Consequently, the third AppCode icon 386 is located in the upper right quadrant of the scoring grid 366.

Adjustments to the weighting of the plurality of titles 383 can adjust a location in the scoring grid 366 which is used for migration wave-planning. The adjustments also result in an adjustment of the position of AppCodes within the scoring grid relative to other AppCodes also located in the grid 366. As a result the grouping of AppCodes for migration wave planning can be customized based on the weighting provided using the user interface 382.

The preceding embodiments facilitate a highly granular adjustment to AppCode scoring that is customized by the user based on the preferences of the enterprise. Further, the preceding is accomplished in the planning phase of an overall deployment process. In various embodiments, this approach can provide the most efficient and effective migration because the provisioning occurs following an application of the customized weighting.

Referring now to FIG. 4, a flow diagram of a process 400 employed to organize a migration of software resources to the cloud is illustrated in accordance with one embodiment. In general, the process 400 is employed in a planning process for migration of the enterprise software resources 102 to the public cloud 104. In particular, the process 400 can be used with the planning resources 230 to establish the migration wave-plan provided to the provisioning resources 240 in the pipeline 200 illustrated in FIG. 2.

In various embodiments, the process 400 includes actions and decision points. According to the illustrated embodiments, the actions include an act of inventorying application data for an enterprise 410, an act of inventorying servers for the enterprise 412, an act of assigning AppCodes 414, an act of completing a cloud readiness checklist 416, an act of applying survey results for the enterprise applications 418, an act of generating a prioritized wave plan based on survey results 420, an act of customizing the scoring model to generate a custom prioritized wave plan 422, an act of determining a migration approach for AppCodes included in a selected migration wave 424, an act of continuing to a provisioning module for the selected wave 426 and an act of selecting the next wave 428. According to the illustrated embodiment, the decision point included in the process 400 is determining whether all AppCodes have moved to provisioning 430.

According to the illustrated embodiment, the process 400 starts at the act 410 where the act of inventorying application data for an enterprise occurs. Here, applications included in the enterprise software resources 102 are identified so that they can be included in the migration plan. The act of inventorying application data for an enterprise 410 can include manual entry or an import of the data via a CMDB. According to one embodiment, the act of inventorying application data for an enterprise 410 includes a combination of the preceding approaches. The process continues at the act of inventorying servers for the enterprise 412. Here, the server infrastructure that supports the operation of the enterprise software resources 102 is identified so that the servers are included in the migration plan. The act of inventorying servers for the enterprise 412 can include manual entry or an import of the data via a CMDB or a discovery tool. According to one embodiment, the act 412 includes a combination of two or more of the preceding approaches. In one embodiment, the act of inventorying application data for an enterprise 410 and the act of inventorying servers for the enterprise 412 are combined within a single act included in the process 400.

The preceding acts identify various software and hardware components that support the enterprise software resources 102 of FIG. 1 as well as the interrelationships of the various software and hardware components. At the act of assigning AppCodes 414, applications or application segments are assigned an AppCode and servers are associated with the applications. The act of assigning AppCodes 414 can include a variety of considerations such as the data security classification of the application, batch processing requirements of the application and real-time processing requirements of the application. According to one embodiment, the act of assigning AppCodes 414 includes an act of creating new AppCodes.

At the act of completing the cloud readiness checklist 416, the readiness of the software application is evaluated based on an initial questionnaire. In one embodiment, the initial questionnaire is relatively short and includes fewer than 20 questions. For example, the initial questionnaire can include a checklist of ten questions. In the illustrated embodiment, the act of completing the cloud readiness checklist 416 includes both the act of soliciting the responses and evaluating the response to determine whether survey data should be collected for the software application. Where the act of completing the cloud readiness checklist 416 results in a determination that the software application is ready, the process 400 moves to a collection and evaluation of detailed survey data (for example, as provided by answers to the survey 580). Alternatively, the act of completing the cloud readiness checklist 416 is repeated if it is determined that the cloud readiness checklist is incomplete. In some embodiments, the act of completing the cloud readiness checklist and the act of determining whether the software application is ready to proceed further are completed in two separate acts.

At the act of applying survey results for the enterprise applications 418, the survey data is applied to the associated AppCode. As a result, the AppCode is assigned a score at the act 418. In the illustrated embodiment, the survey data is also collected at the act 418, while in an alternate embodiment the survey data is collected in a separate act that occurs in advance of the act of applying survey results for the enterprise applications 418.

At the act of generating a prioritized wave plan based on survey results 420, a migration wave plan is generated for the enterprise software resources 102 based on the AppCode scores. In one embodiment, the act 420 is based on the default scores for each of the AppCodes. The default scores are those that are determined prior to the application of any customized weighting.

According to some embodiments, the scores include a score for the business value of the software application and a score for the application complexity. The result is an initial migration wave plan that is generated at the act 420 based on these default scores.

At the act of customizing the scoring model to generate a custom prioritized wave plan 422, the user selects custom weighting to adjust the relative importance of one or more elements of the survey data. That is, to add and/or adjust the weighting concerning the answers provided to the questions included in the survey. This results in the adjustment of one or more AppCode scores. Consequently, at the act 422 a new migration wave plan is generated to reflect the customized priorities determined by the enterprise.

According to the illustrated embodiment, the act of determining a migration approach for AppCodes included in a selected migration wave 424 is performed once the customized wave plan is generated at the act 422. Here, the user of the cloud migration system 106 determines how to migrate AppCodes for a selected quadrant included in the scoring grid 366. According to some embodiments, a detailed analysis of the applications is performed and one or more migration approaches are developed at the act 422. In various embodiments, the AppCodes located in the upper right quadrant of the scoring grid 366 are included in the first migration wave because they have a combination of the greatest business value and the lowest complexity to migrate.

With the migration plan established for the selected migration wave, the process moves to the act of continuing to the provisioning module for the selected wave 426. Here, for example, the AppCodes for the selected migration wave can move from the planning resources 230 to the provisioning resources 240 as illustrated and described with reference to FIG. 2. Regarding the overall deployment process, the selected migration wave can move from the provisioning resources 230 to the compliance resources as further described with reference to FIG. 2.

The process 400 moves from the act 426 to the act of determining whether all AppCodes have moved to provisioning 430. That is, have the AppCodes in all four quadrants already moved to the provisioning phase of the migration? The process 400 ends where the migration waves for all AppCodes have moved to provisioning because the migration wave planning is complete. Alternatively, if one or more migration waves and associated AppCodes have not yet moved to provisioning, the process 400 continues to the act of selecting the next wave 428 for migration. Once the next migration wave is selected, the process continues to the act of determining a migration approach for AppCodes included in a selected migration wave 424, for the next migration wave. According to the illustrated embodiment, the act of continuing to the provisioning module for the selected wave 426 and the act of determining whether all AppCodes have moved to provisioning 430 is repeated until all of the AppCodes included in the migration have moved to provisioning.

Figure 6:
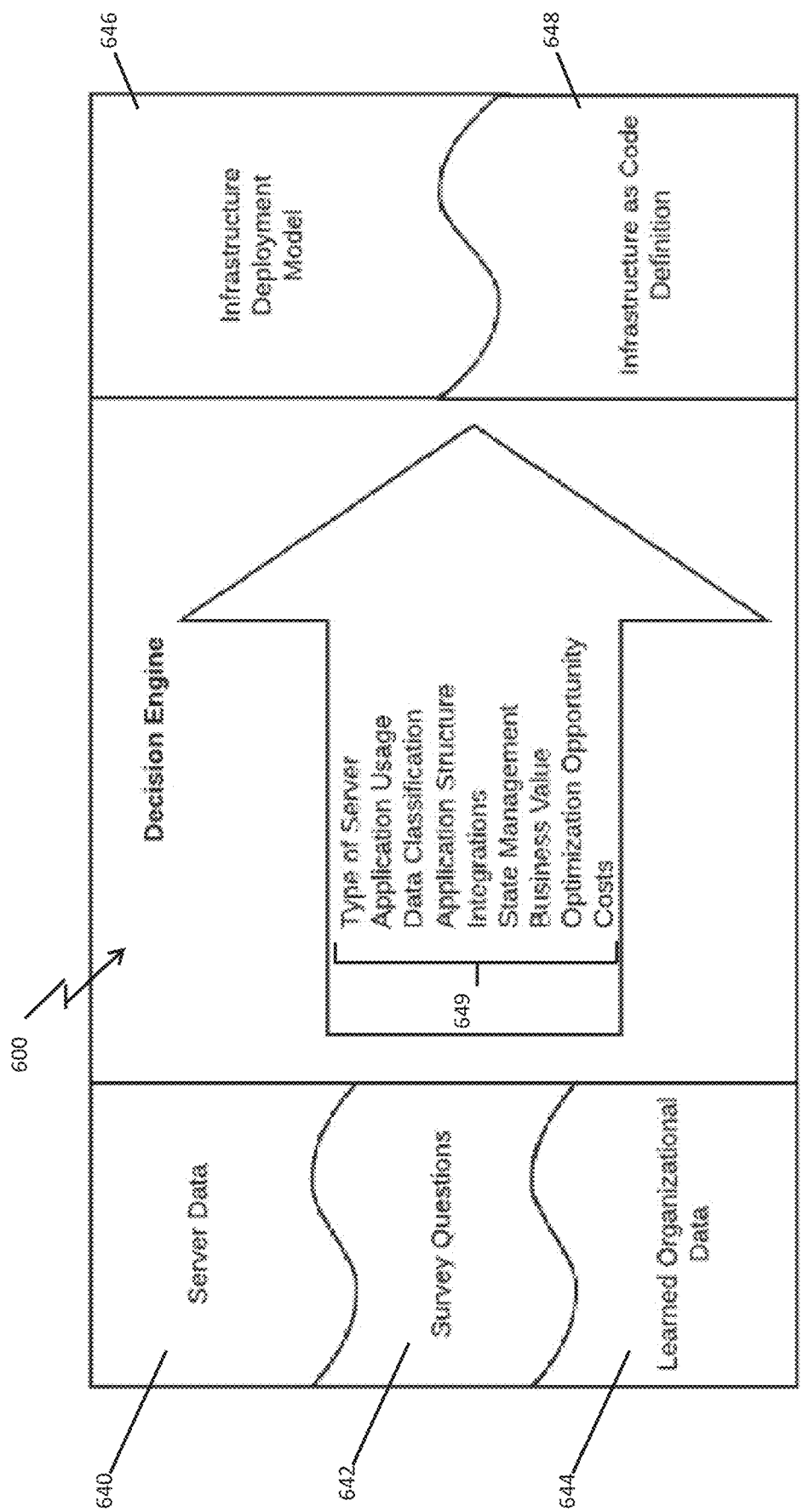
FIG. 6 illustrates a decision engine employed for cloud-migration in accordance with one embodiment.

Referring now to FIG. 6, a decision engine 600 used in the provisioning of software resources for a cloud migration is illustrated in accordance with one embodiment. In various embodiments, the decision engine is included in the provisioning resources 240, for example, the decision engine 248. As illustrated in FIG. 6, the decision engine 600 is included in a flow of information that results in the creation of an IaC definition. FIG. 6 illustrates sources of information, methodologies and priorities such as server data 640, survey questions 642 and learned organizational data 644. FIG. 6 also illustrates information that is created using the decision engine 600 including an infrastructure deployment model 646 and an infrastructure as code definition 648.

In various embodiments, the decision engine 600 operates to predict a cloud deployment model for a set of IT resources (for example, one or more of the software resources 102) based on a plurality of information 649 that is included in or derived from the server data 640, the survey questions 642 and the learned organizational data 644. According to one embodiment, the preceding provide survey data provided by the enterprise for the software application, organizational standards for the enterprise, server inventory data for the software application and learned approaches for creating cloud deployment models for the enterprise.

FIG. 6 illustrates an embodiment in which the plurality of information 649 includes: a type of server employed by the application; application usage; data classification; application structure; integrations with other applications; state management for an application; a business value of the application; any optimization opportunities for the application; and migration costs. In operation, a predicted deployment model can be made using any one of or any combination of the listed information or the listed information and other information. For example, the cloud deployment pattern selected by the enterprise is included in the plurality of information 649 used by the decision engine 600 to select a deployment model. According to some embodiments, the decision engine 600 operates to automatically select the deployment model. In these embodiments, the code instructions that specify the details of the infrastructure are automatically generated using the decision engine 600. For example, the decision engine 600 selects the deployment model 646 from which the infrastructure as code definition 648 is automatically generated.

Figure 7:
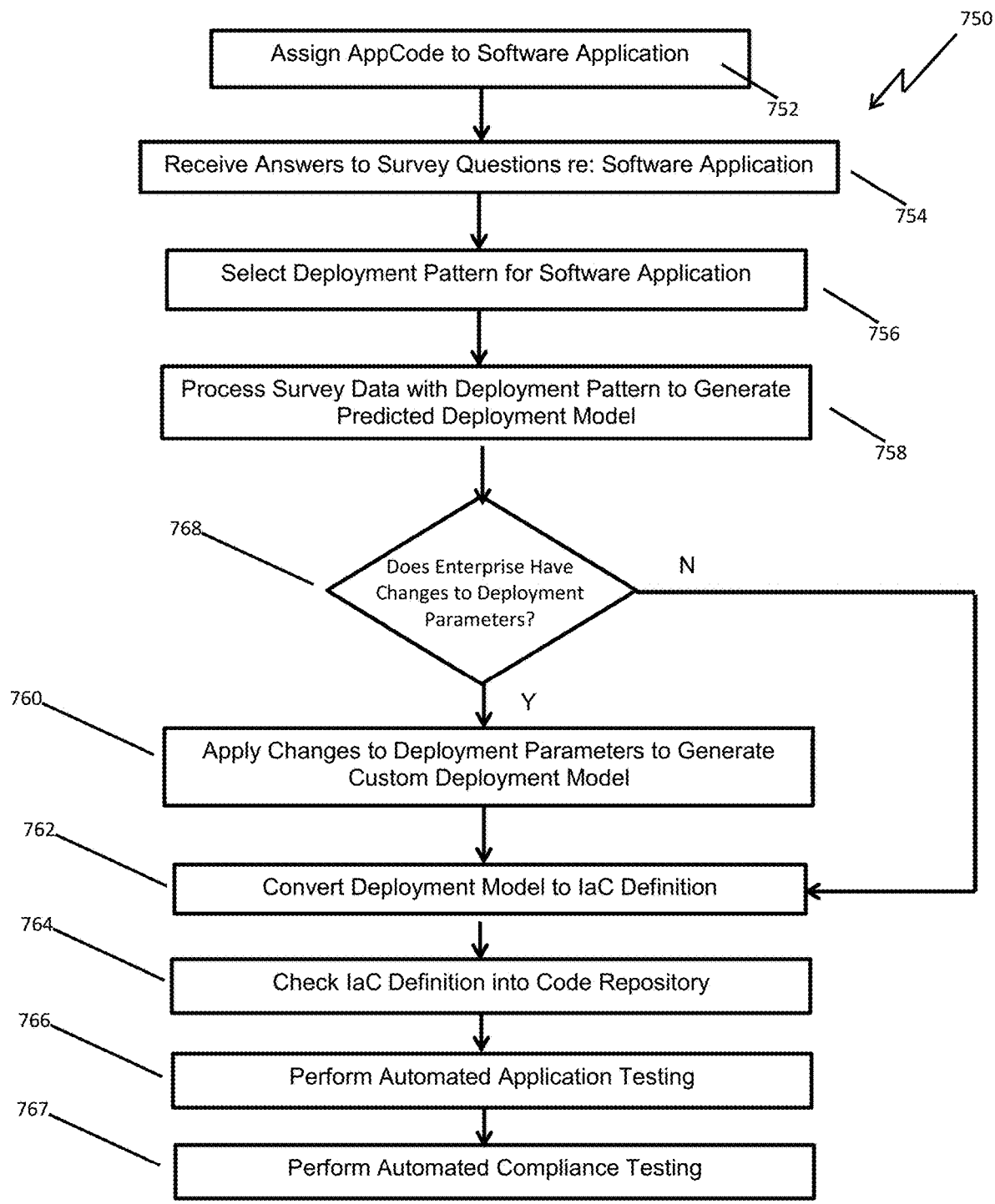
FIG. 7 illustrates a flow diagram of a process employed with the decision engine of FIG. 6 in accordance with one embodiment.

Referring now to FIG. 7, a flow diagram of a process 750 employed with the decision engine of FIG. 6 is illustrated in accordance with one embodiment. In various embodiments, the process 750 is employed to provision a software application for operation as a resource operating on a cloud computing network accessible to a plurality of users associated with an enterprise. For example, the process 750 can allow an enterprise to specify the entire rollout of multiple applications on the cloud using "Infrastructure-as-Code" (IaC). Further, embodiments of the process 750 provide the preceding with one or more automated steps to generate the IaC. The automation provided by these embodiments can significantly reduce the amount of work required of software engineers to write the code instructions needed to specify the details of the infrastructure.

In various embodiments, the process 750 includes actions and decision points. According to the illustrated embodiments, the actions include an act of assigning an AppCode for a software application 752, an act of receiving answers to survey questions regarding the software application 754, an act of selecting a deployment pattern for the software application 756, and act of processing survey data with the deployment pattern to generate a predicted deployment model 758, an act of applying changes to deployment parameters to generate custom deployment model 760, an act of converting a deployment model to the IaC definition 762, an act of checking the IaC definition into a code repository 764, an act of performing automated application testing 766 and an act of performing automated compliance testing 767. According to the illustrated embodiment, the process 750 also includes the decision point an act of determining whether the enterprise has changes to deployment parameters 768.

According to the illustrated embodiment, the process 750 starts at the act 752 where an Appcode is assigned to the software application. At the act of assigning the AppCode to the software application 752, the application or segments of the application are assigned an AppCode and servers are associated with the applications. Whether the application is assigned a single AppCode or different segments of the application are assigned different AppCodes will vary depending on a variety of considerations, for example, the data security classification of the application, batch processing requirements of the application and real-time processing requirements of the application.

According to the illustrated embodiment, the act of receiving answers to survey questions regarding the software application 754 follows the act 752. For example, the act 754 can be completed, at least in part, by the survey module 232 illustrated in FIG. 2. Further, the survey can include a format consistent with the format of the survey 580 illustrated in FIG. 5. The process next moves to the act of selecting the deployment pattern for the software application 756. For example, the user can determine the deployment pattern based on the resources most suitable for supporting the software application in view of the characteristics of the software application. Example deployment patterns include EC2 Persistence, EC2 Non-Persistence, Serverless and Container.

The process 750 employs the deployment pattern determined at the act 756 and the survey data received at the act 754 to generate a predicted deployment model at the act 758. However, the process 750 provides the user an opportunity to customize the deployment model at the act of determining whether the enterprise has changes to deployment parameters 768. If the user does not have any changes to the deployment parameters, the predicted deployment model generated at the act 758 does not change and the process moves to the act of converting the deployment model to the IaC definition 762. Alternatively, if at the act 768, the user determines that the enterprise does have one or more changes to the deployment parameters the process moves to the act of applying changes to deployment parameters to generate a custom deployment model 760. For example, a change to the amount of memory required for the application can be made at the act 760. The customer deployment model is then also generated at the act 760 based on the change. In one embodiment, the process includes a separate act of changing the deployment parameters followed by an act of generating the custom deployment model that results. According to some embodiments, the acts 758 and 760 are completed by a decision engine, for example, the decision engine 600 illustrated and described with reference to FIG. 6.

The process 750 moves to the act of converting the deployment model to the IaC definition 762 using the custom deployment model generated at the act 760. Whether the act 762 is performed using a predicted deployment model or a custom deployment model, the deployment model is converted to source code to define the IaC. The process next moves to the act of checking the IaC definition into a code repository 764. According to some embodiments, the code repository is employed in a CI/CD process used in deploying the software application to the cloud computing network.

With the IaC checked into the code repository, the process 750 moves to the act of performing automated application testing 766 followed by the act of performing automated compliance testing 767. At the act 766, the infrastructure definition is tested based on standards defined by the planning resources 230 and provisioning resources 240. The act 766 can include alerts and notifications regarding issues that are identified during the automated testing. This allows the issues to be addressed before the process moves to the act of performing automated compliance testing 767.

At the act 767, the infrastructure definition undergoes automated testing for compliance with the standards applicable to the application. In one embodiment, the compliance testing is performed using the compliance rules module 257 and the pre and post deployment rules-base 258 included in the compliance resources 250 illustrated in FIG. 2. In various embodiments, the automated compliance testing applies rules concerning compliance with each of regulatory standards, operational and industry standards and security standards. In one embodiment, the IaC is not deployed to a live environment until all the compliance tests performed at the act 767 are successfully passed. Further, the act 767 can also include alerts and notifications regarding issues that are identified during the automated compliance testing. This allows the issues to be addressed such that the process 750 can be completed.

Depending on the embodiment, one or more of the acts included in the process 750 may also be included in the process 400. For example, either or both of the act 752 and the act 754 may correspond to acts included in the process 400.

Figure 8:
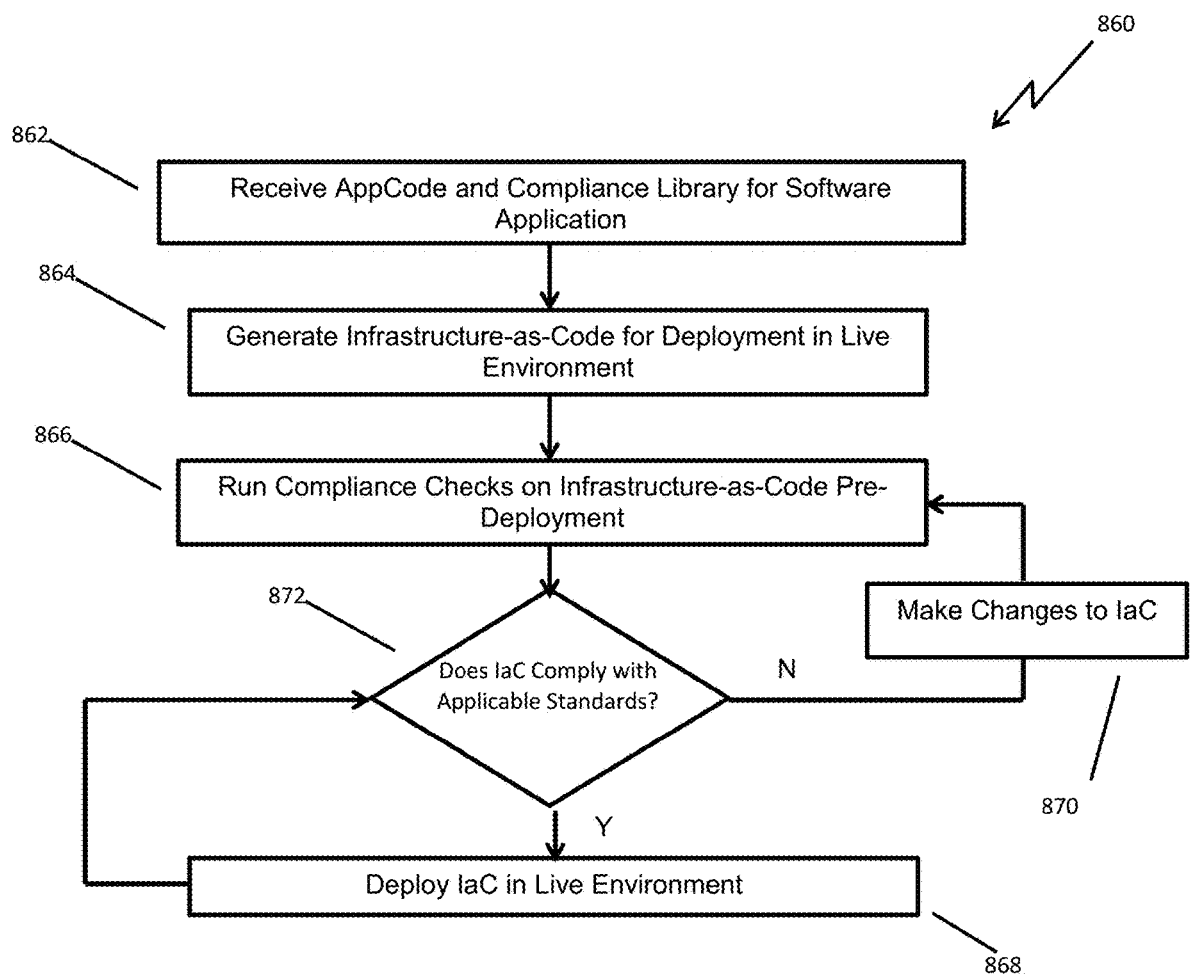
FIG. 8 illustrates a flow diagram of a process including a compliance-check employed in a migration of software resources to the cloud according to one embodiment.

Further elements of the deployment process are provided in FIG. 8 where a process 860 for compliance-checking software resources for migration to the cloud computing network is illustrated according to one embodiment. In various embodiments, the process 860 includes actions and decision points. According to the illustrated embodiments, the actions include an act of receiving an AppCode and associated compliance library for a software application 862, an act of generating infrastructure-as-code for deployment in the live environment 864, an act of running compliance checks on infrastructure-as-code pre-deployment 866, an act of making changes to the IaC 870 and an act of deploying the IaC in the live environment 868. According to the illustrated embodiment, the process 860 also includes the decision point an act of determining whether the IaC complies with applicable standards 872.

At the act of receiving an AppCode and associated compliance library for a software application 862, the AppCode assigned to the software application and one or more libraries that define the operational and industry standards, the security standards and regulatory compliance frameworks applicable to the software application are provided. The AppCode can be first assigned as a part of a process that occurs earlier in the migration pipeline, for example, at the act 414 included in the process 400 or the act 752 included in the process 750. Further, in some embodiments, the security and configurations libraries module 246 illustrated in FIG. 2 can provide the compliance library.

At the act of generating infrastructure-as-code for deployment in the live environment 864, the source code is generated in a selected configuration language to define the IaC. In some embodiments, the generation of IaC occurs in a provisioning process, for example, as a part of the process 750 illustrated in FIG. 7.

Compliance checks are run on the infrastructure-as-code pre-deployment at the act 866. In one embodiment, the compliance checks included in the process 860 are performed with compliance resources such as the compliance rules module 257 illustrated in FIG. 2. Further, the process 860 can employ rules provided by the rules-base 258 included in the compliance rules module 257.

A determination of whether the IaC complies with applicable compliance rules is made at the act 872. Here, for example, the compliance rules module 257 can be employed to check the IaC against the rules-base. If the IaC complies with the applicable compliance rules, the process moves to the act of deploying the IaC in the live environment 868. Alternatively, if at the act 872, a determination is made that the IaC does not meet the compliance requirements the process moves to the act of making changes to the IaC 870. The act 870 provides the user with an opportunity to make the necessary changes to the IaC such that it meets the compliance requirements. The act 866 is performed to determine whether the changes were successful such that the IaC meets the compliance requirements of the application. The act 872, the act 870 and the act 866 can be repeated as needed until the IaC meets the applicable standards at the act 872 and is deployed to the live environment at the act 868.

As described above, the rules-base that is applied for the compliance checks performed pre deployment can also be used to check the IaC in the live environment. As a result, the act of deploying the IaC in the live environment 868 can be followed by periodic checks for compliance performed again at the act 872 included in the process 860.

Various aspects of the cloud migration systems described herein (for example, the cloud migration system 106) can be implemented as specialized software executing in a general purpose computing device such as a PC, a laptop, a tablet computer or other handheld computing device. Accordingly, any of the embodiments described herein can include a non-transitory computer readable medium in which instructions are stored that when executed by a processing system implement aspects described herein.

While illustrated and described with reference to migration to a public cloud system, the approaches described herein can be employed with various types of cloud configurations depending on the embodiment. For example, depending on the embodiment, the systems and methods described herein can be employed in migrating IT resources to any of public clouds, community clouds, private clouds or hybrid clouds.

Further, while illustrated and described with reference to a migration of "enterprise" resources referred to herein, individuals, groups, entities of any type (public, private, for profit, non-profit, community-based, etc.) can own or otherwise have responsibility for the IT resources (for example, the software resources 102) that are being migrated to the cloud depending on the embodiment.

As is apparent in view of the above detailed description, the computer implementation of various embodiments is an integral and inseparable part of these embodiments. Further, these embodiments provide improved technological processes. For example, the scope and complexity of migrating enterprise resources to the cloud make it completely impractical to complete without the use of computers and communications networks. Thus, implementing embodiments described herein using one or more computers provide features and benefits that would be lacking in any attempt at non-computer implementations of these embodiments.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system including a pipeline configured to deploy infrastructure-as-code to a cloud computing network for an enterprise, the system comprising:
   a survey module configured to receive information concerning a value to the enterprise of a software application and a complexity of migrating the software application to the cloud computing network;
   an application scoring module configured to determine a default score for the software application based, at least in part, on the information received by the survey module; and
   a weighting module configured to receive weights assigned by the enterprise for each of a plurality of characteristics concerning the software application, respectively, the weights reflective of an understanding by the enterprise of at least one of the value to the enterprise of the software application and the complexity of migrating the software application,
   wherein the application scoring module is configured to generate a customized score for the software application based on an adjustment to the default score resulting from the weights.

2. The system of claim 1, further comprising a wave planning module configured to employ the customized score to locate the software application in a selected one of a plurality of migration waves.

3. The system of claim 2, wherein the wave planning module is configured to locate the software application in a first migration-wave as a result of the default score, and
   wherein the wave planning module is configured to locate the software application in a second migration-wave as a result of the customized score, the first migration wave different than the second migration wave.

4. The system of claim 2, further comprising a display module configured to render a first set of user inputs in a graphical user interface, the first set of user inputs including a user-adjustment of the weights assigned each of the plurality of characteristics concerning the software application, respectively.

5. The system of claim 4, wherein the display module is configured to render a grid in the graphical user interface, the grid configured to display a plurality of icons each representing one of the plurality of software applications, respectively, and
   wherein a location of the respective icons within the grid is determined by the weights assigned by the enterprise for each of the plurality of characteristics concerning the respective software application.

6. The system of claim 5, wherein the grid includes a plurality of regions including a first region,
   wherein the respective software applications located in the first region are included in a common migration-wave with one another, and
   wherein the wave planning module is configured to provide details concerning the respective software applications for a generation of the infrastructure-as-code to another element in the pipeline.

* * * * *